United States Patent

Mina

[11] Patent Number: 5,971,671
[45] Date of Patent: Oct. 26, 1999

[54] DOUBLEEDGED MILLING CUTTER PROVIDED WITH A SINGLE CUTTING TIP AND HAVING INCREASED STRENGTH AND PRECISION

[75] Inventor: Livio Mina, Brescia, Italy

[73] Assignee: Utensileria Schneider SRL, Gussago/Bs, Italy

[21] Appl. No.: 08/989,629

[22] Filed: Dec. 12, 1997

[30] Foreign Application Priority Data

Dec. 13, 1996 [IT] Italy .................................. BS96A0100

[51] Int. Cl.[6] ............................................... B23C 5/22
[52] U.S. Cl. ................................ 407/42; 407/54; 407/65; 407/113
[58] Field of Search ................................ 407/42, 40, 35, 407/54, 65, 113

[56] References Cited

U.S. PATENT DOCUMENTS

| | | | |
|---|---|---|---|
| 4,525,109 | 6/1985 | Bylund | 407/42 X |
| 4,527,930 | 7/1985 | Harroun | 407/42 |
| 4,588,331 | 5/1986 | Yoshinori | 407/42 X |
| 4,679,968 | 7/1987 | Tsujimura et al. | 407/113 X |
| 5,580,194 | 12/1996 | Satran et al. | 407/40 |

Primary Examiner—Andrea L. Pitts
Assistant Examiner—Henry W. H. Tsai
Attorney, Agent, or Firm—William W. Jones

[57] ABSTRACT

To increase the sturdiness and precision of a double-edged milling cutter having a single cutting tip, the cutting tip is inserted in a recess of a milling cutter body, with the recess being constituted by two spaced-apart opposite sidewalls. One sidewall is designed as a rigid sidewall. By way of a cavity extending transversely of the longitudinal axis of the milling cutter body, the thickness of the other sidewall is locally reduced across the entire width thereof, so that it is "elastic". The cutting tip is fixed between the two sidewalls by means of a mounting screw.

8 Claims, 3 Drawing Sheets

DOUBLEEDGED MILLING CUTTER PROVIDED WITH A SINGLE CUTTING TIP AND HAVING INCREASED STRENGTH AND PRECISION

BACKGROUND OF THE INVENTION

The invention relates to a double-edged milling cutter which is formed by a milling cutter body and a single cutting tip (insert).

Such a milling cutter is part of the group of milling cutters which are mostly provided with a receiving shank, with the cutting tip being received in a transverse recess of the milling cutter body such that it projects with its sides from two diametrically opposed sides of the body as well as in axial direction. The two projecting sides constitute the cutting edges. The cutting tip can have various forms, in particular it may have cutting edges that are almost parallel to the axis of the milling cutter, or in case of more widespread cutters it may have a partly spherical shape.

The present specification, for reasons of simplification, relates only to milling cutters of the partly circular type, with the milling cutter with such a cutting tip being referred to also as "spherical" in practical application, with this including however also cutting tips of other shapes. In general, such milling cutters are capable of milling also with axial feed and thus are referred to as "drilling milling cutters"; they find application also when milling free shapes (copy milling).

FIG. 6 of the drawings schematically shows a type of milling cutter according to the prior art. FIG. 6 shows a milling cutter body 10 and a double-edged cutting tip 11. Formed in the milling cutter body is a recess 12 having two mutually opposed sidewalls 13 and 14 for receiving the cutting tip 11 provided with a bore 15 for receiving a mounting screw 16.

One wall 13 of recess 12 has a through-bore 13' for the head of the mounting screw 16, whereas the other wall 14 is provided with a threaded bore 14' in which mounted screw 16 is threadedly received. The cutting tip 11 in turn has an axial back 11' abutting a bottom wall 12' of the recess 12 for the cutting tip.

The back 11' of the cutting tip and the floor 12' of the recess in some cases are provided with designs of different nature, having the purpose of centering the cutting tip with respect to the axis of the milling cutter. However, in most cases such centering is obtained by a perfect cylindrical alignment between the mounting screw 13 and the bore 15 of the cutting tip, as can be seen from FIG. 6.

For the preparation of the milling cutter, the cutting tip is introduced into the recess; the screw is inserted into the bore within the first wall, then through the bore in the cutting tip itself and then it is threadedly engaged with the threaded bore of the other wall. By tightening of the screw up to a stop, the two parallel walls of the recess are urged together in the manner of pliers and they thus lock the cutting tip. The system according to the prior art as described hereinbefore has found extensive distribution, however the use thereof has revealed some insufficiencies.

One insufficiency resides in the fact that, upon clamping of the cutting tip, part of the force developed by the screw 16 by the torque (moment) applied to the screw is consumed for bending the walls 13 and 14 of recess 12. The consequence is that the force effectively available for retaining the cutting tip frequently is insufficient for ensuring mounting in the manner required for the cutting tip so that the latter does not become instable during use.

Another insufficiency results from the fact that walls 13 and 14 of the recess, which theoretically should be symmetrical, hardly are so in reality, which is due to manufacturing tolerances, non-homogeneity of the material, different configurations (one wall contains the through-bore and the recess for the screw head, the other wall contains the threaded bore), so that the walls have different bending strengths, due to which the amount of bending of the two walls is not uniform, whereby the possibility is lost of performing milling with axial feed.

An additional insufficiency results from the fact that the resistance moment acting on the milling cutter, and thus on the cutting tip, during use thereof may be a cause to the effect that the walls of the recess receiving the cutting tip are spread apart, so that the cutting tip becomes instable, with the result that the milling cutter cannot be used any more in case of such spreading.

The present invention seeks to solve the above explained problems and to provide a milling cutter with increased strength and reliability, i.a. a milling cutter which displays higher precision and increased performance during use.

BRIEF SUMMARY OF THE INVENTION

To this end, the invention provides a double-edged milling cutter with one single cutting tip, wherein the two opposite walls of the recess of the milling cutter body for receipt of the cutting tip are designed such that one wall is substantially rigid and forms a reference surface for the position of the cutting tip, while the other wall is formed to be resilient and has a transverse recess formed in the outside of this wall above the mounting screw and extending towards the interior so as to reduce the thickness of the remaining full cross-section without reducing the width.

Further features and advantages of the invention will be apparent from the description below.

BRIEF DESCRIPTION OF THE DRAWINGS

The invention described below, by way of example only, with reference to the accompanying drawings, wherein.

DESCRIPTION OF THE PREFERRED EMBODIMENTS

Figure 2:
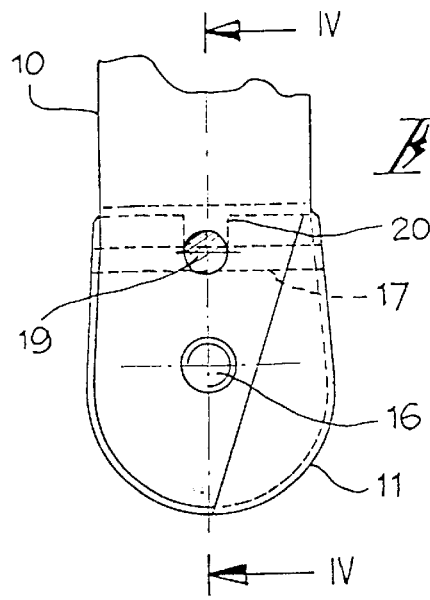
FIGS. 2 and 3 show the milling cutter according to the invention as seen from two opposite sides.
Figure 1:
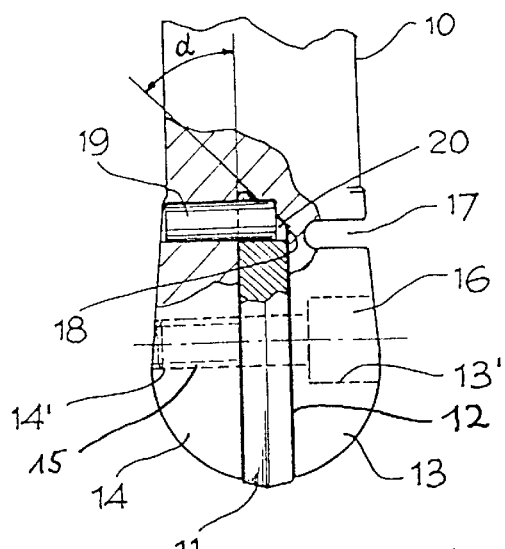
FIG. 1 shows a fragmentary sectional view according to the arrows IV—IV in FIG. 2.
Figure 3:
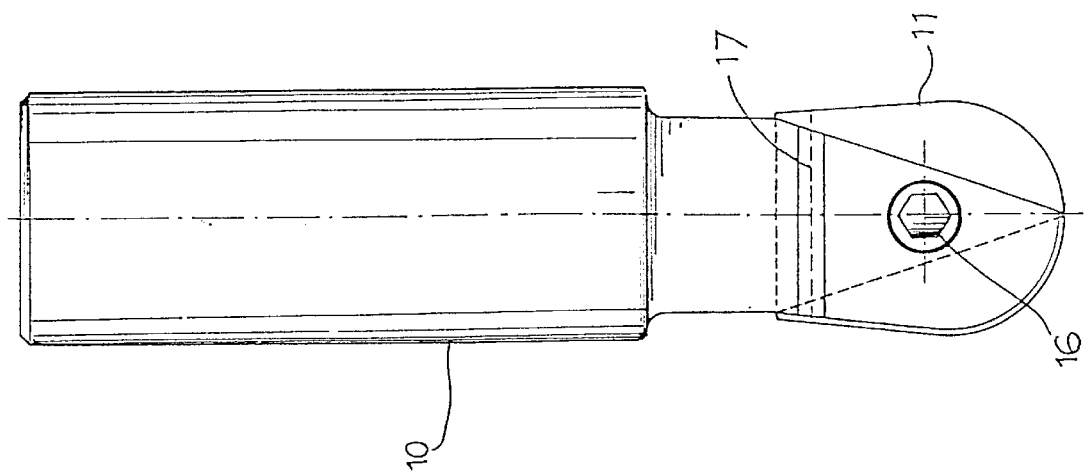
Figure 6:
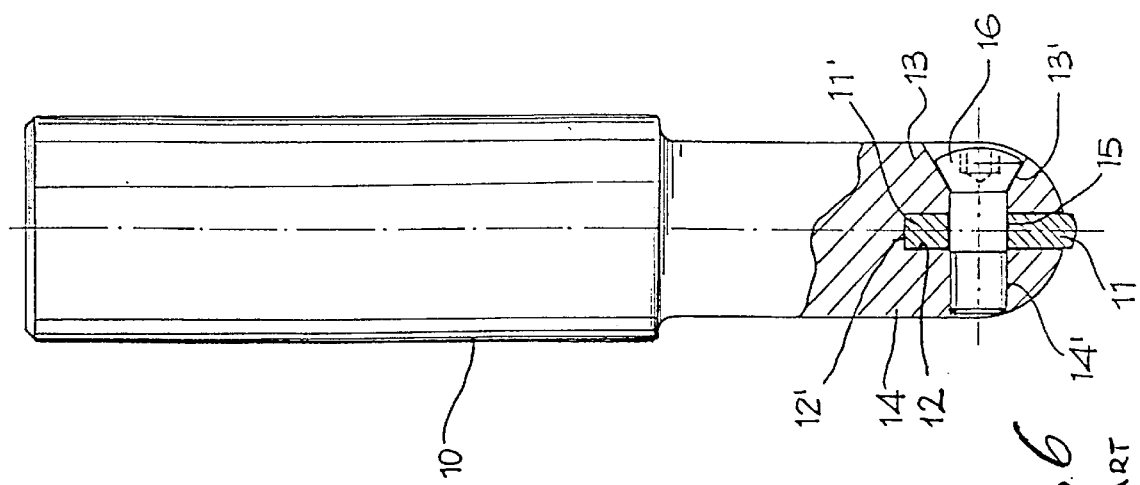
FIG. 6 shows a view, partly in section, of a milling cutter according to the prior art.

FIGS. 1 to 3 depict a milling cutter according to an embodiment of the invention. Those elements or parts corresponding to like elements and parts of the known milling cutter shown in FIG. 6 are provided with the same reference numerals. The milling cutter according to the invention thus has a milling cutter body 10 having a recess 12 that is constituted by two mutually opposed walls 13 and 14 and serves for receiving a cutting tip 11.

This cutting tip 11 has a bore 15 through which extends a mounting screw 16, the screw head of which is received in a recess 13' formed in one wall 13 of said recess 13, and the threaded shank of which is threaded into a threaded bore 14' of the opposite wall 14.

The back 11' of the cutting tip 11 and the bottom 12' of the recess 12 are of complementary configuration, as can be seen from the drawings. It will be noted from FIG. 1, that bottom wall 12' of the recess 12 can be formed at an included angle α of less than 90° with respect to the side walls of the cutter 11. It will also be noted from FIG. 1b that the back 11' or the cutting tip 11 can be partially or completely rounded so as to form a curved surface having an axis that is parallel to the walls 12 of the recess.

According to the invention, one wall 14 of the recess 12 is extremely rigid and flexurally stiff and will be referred to as "rigid wall" in the following. This rigid wall forms a stable reference and abutment face for positioning and adjusting the cutting tip. The opposite wall 13 is highly flexible and will be referred to in the following as "elastic wall" or "resilient wall". It is disposed preferably on the side of the screw head of the mounting screw 16. The elastic wall 13 is designed such that it has, in its outside surface above mounting screw 16, an elasticity recess 17 that is located in a plane extending transversely of the longitudinal axis of the milling cutter body and extending into this wall towards the recess 12 up to such a depth that a zone 18 with full cross-sectional area is left standing which in essence is wide and thin, as can be seen in particular in FIG. 1.

The presence of such an elastic wall 13 solves the above-mentioned problem of the loss in force required for holding the cutting tip 16 by the mounting screw 16. In addition thereto, the elasticity of the thus formed elastic wall 13 is achieved without impairing the torsional resistance of this very wall.

Such an arrangement of the elasticity recess 17 within the wall 13, in contrast to an inner "bore" of the recess, as it is frequently used in practical application for obtaining flexibility, in fact increases the modulus of elasticity for the torsional resistance W and minimizes that of the bending resistance J.

This results in a low bending resistance and thus also a low loss in useful strength as well as increased torsional rigidity, which contributes to the stability of the cutting tip.

The invention thus solves the problem of positional accuracy of the cutting tip 11 not only with the aid of the rigidity of the rigid wall 14 acting as reference wall that is neither tensioned nor displaced, but rather in essence only the elastic wall 13 becomes tensioned in conjunction with a rear-side tongue-and-groove joint between the recess and the cutting tip, namely between the bottom 12' of the recess and the back 11' of the cutting tip. Such a tongue-and-groove joint at the same time solves the problem of spreading of the recess when the milling cutter in use is subjected to considerable torsional moments.

Figure 1A:
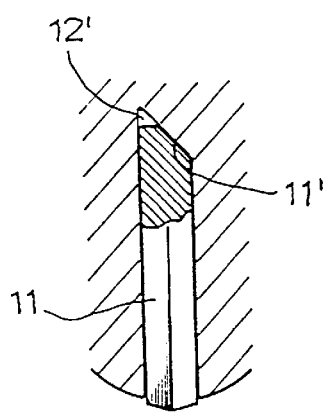
FIG. 1a shows a detailed representation of a cutting tip with angled back according to FIG. 1.
Figure 4:
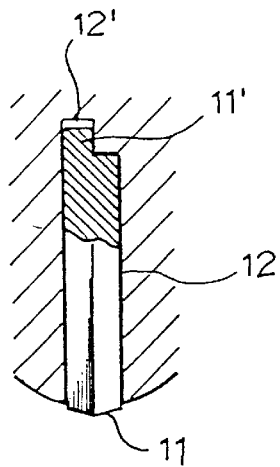
FIGS. 4 and 5 show two modified embodiments for the connection between the cutting tip back and the bottom of the recess.
Figure 5:
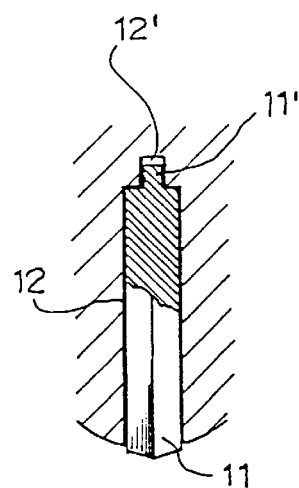
Figure 1B:
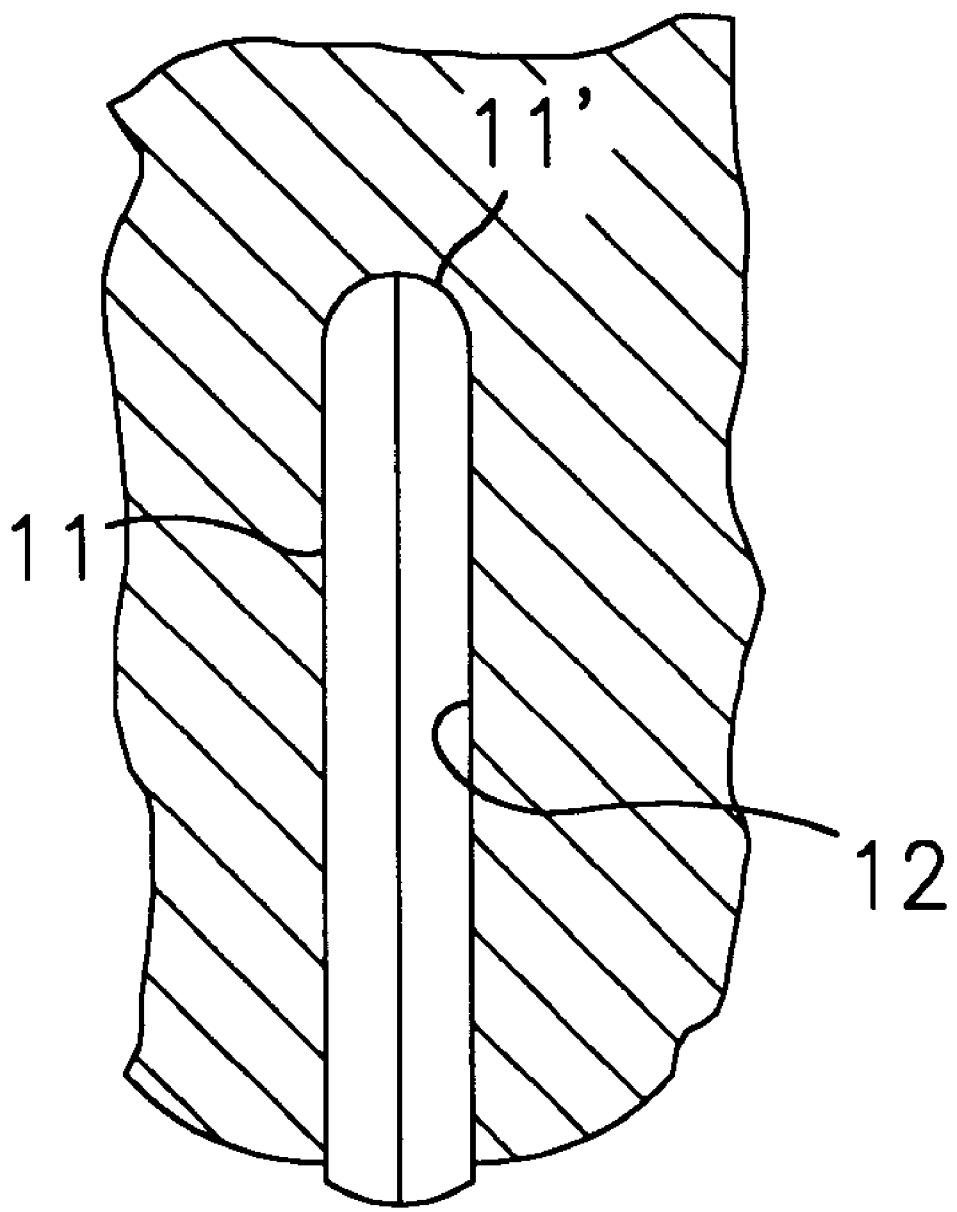
FIG. 1b shows an alternate configuration of the basal end of the cutter insert.

The groove design according to FIGS. 4 and 5 can be formed with parallel planes, with the rear part of the back 11' of the cutting tip being of prismatic or stepped configuration and confined by parallel planes in accordance with an indentation in the bottom 12' of the recess 12, with the prismatic part and the associated indentation having a width that is somewhat smaller than that of the recess. As an alternative, the groove may be formed in angular manner, namely wedge shaped as shown in FIGS. 1 and 1a, with the back 11' of the cutting tip 11 having an oblique plane forming an acute angle with the inside surface of the rigid wall 14.

The solution mentioned first has the advantage that the torque causes no force components having the tendency to displace the cutting tip in axial direction, which however is accompanied by the disadvantage of unavoidable play, be it for the purpose of mounting of the cutting tip, be it due to manufacturing tolerances. Such play may be the cause of vibrations of the cutting tip which, though small, are nevertheless are harmful.

The second solution has at least hypothetically the disadvantage that the torque leads to a force component which, when unless there are further factors, could displace the cutting tip towards the front. However, this hypothetical disadvantage nevertheless is made up by the fact that the axial resetting force in use acts in the opposite direction and urges the cutting tip into the groove. In contrast thereto, the second solution has the considerable advantage that the angled groove in cooperation with the axial resetting force eliminates the play between the cutting tip and the bottom of the recess and also between the base area of the cutting tip and the rigid wall of the recess against which the cutting tip abuts.

Centering of the cutting tip with respect to the milling cutter body is achieved, according to FIG. 1, by a pin 19 or a projection extending into the recess and engaging a corresponding recess 20 in the back of the cutting tip.

Locking during operation of the cutting tip is effected by means of transverse screw 16 extending through the through-bore 15 of the cutting tip and compressing the cutting tip between the elastic and the rigid wall.

I claim:

1. A double-edged milling cutter assembly comprising:
   a) a milling cutter body having an axial recess which is disposed between two opposed side walls of co-extensive length and width, said recess further comprising a bottom wall extending between said side walls, one of said side walls being rigid and the other of said side walls being rendered resilient by means of a cavity in an outside surface of said other side wall, said cavity extending width-wise of said other side wall;
   b) a double-edged cutting tip disposed in said recess, said cutting tip being centered in said recess, with cutting edges of said cutting tip projecting from said recess, equal percentages of opposite surfaces of said cutting tip being supported by said side walls; and
   c) a transverse mounting screw extending between said side walls, said mounting screw bearing against the resilient one of said side walls so as to clamp said resilient side wall against the cutting tip thereby clamping the cutting tip in said recess.

2. The milling cutter assembly of claim 1 wherein the bottom wall of the recess has an indentation for groove-like receipt of a back edge of the cutting tip.

3. The milling cutter of claim 2,
   wherein the indentation in the bottom wall of the recess is prismatic and has parallel walls and a width that is smaller than the width of the recess, and the back of the cutting tip is stepped in a manner corresponding to the indentation.

4. The milling cutter of claim 2,
   wherein the indentation in the bottom wall of the recess is angled and the back of the cutting tip is angled in corresponding manner, with the angled indentation forming an angle of less than 90° with respect to the rigid wall of the recess.

5. The milling cutter assembly of claim 3, wherein an inside surface of the rigid wall is extended so as to form a side of the indentation.

6. The milling cutter of claim 4, wherein the back of the cutting tip is partially or completely rounded so as to form a curved surface having an axis that is parallel to the walls of the recess.

7. The milling cutter assembly of claim 4, wherein an inside surface of the rigid wall is extended so as to form a side of the indentation.

8. The milling cutter assembly of claim 1, wherein a back edge of the cutting tip has a centering recess formed therein in which a centering pin is disposed, said centering pin being received in a receiving bore in the milling cutter body parallel to the mounting screw.

* * * * *